United States Patent [19]
Hansen

[11] Patent Number: 5,827,427
[45] Date of Patent: Oct. 27, 1998

[54] TANK ASSEMBLY

[75] Inventor: Christopher Lee Hansen, Newbury, Ohio

[73] Assignee: Kinetico Incorporated, Newbury, Ohio

[21] Appl. No.: 613,484

[22] Filed: Mar. 11, 1996

[51] Int. Cl.$^6$ .................................................. B01D 25/00
[52] U.S. Cl. ........................ 210/232; 210/284; 210/289
[58] Field of Search ................................... 210/282, 284, 210/291, 541, 279, 232, 289

[56] References Cited

U.S. PATENT DOCUMENTS

| | | | |
|---|---|---|---|
| 2,370,190 | 2/1945 | Ralston | 210/282 |
| 4,693,814 | 9/1987 | Brown | 210/88 |
| 4,804,465 | 2/1989 | Brown | 210/136 |
| 5,310,488 | 5/1994 | Hansen et al. | 210/674 |

Primary Examiner—Ivars Cintins
Attorney, Agent, or Firm—Watts, Hoffmann, Fisher & Heinke Co., L.P.A.

[57] ABSTRACT

A tank coupler for releasably interconnecting serially connected tanks. The tank coupler includes threaded engagement portions which are threadedly engageable with ports formed in the tanks. The coupler defines a central fluid passage which receives in a sealing relationship, a riser tube associated with a first tank and a riser tube associated with a second tank. A snap fit mechanism maintains the engagement of one riser tube with the fluid passage in order to control separation of the riser tube from the coupler when the tanks are separated. O-ring seals mounted in grooves forming part of the fluid passage sealingly engage the periphery of the riser tubes and inhibit fluid leakage between the riser tubes and the coupler. The tank coupler also defines a second fluid passage which cross-communicates the interiors of the tanks. Distributors mounted on opposite ends of the second fluid passage inhibit material from moving from one tank to the other while permitting fluid flow.

18 Claims, 2 Drawing Sheets

TANK ASSEMBLY

TECHNICAL FIELD

The present invention relates generally to tank constructions and, in particular, to stacked, serially connected tank assemblies for use in fluid treatment.

BACKGROUND ART

Certain fluid treatment processes may use compartmentalized tanks containing similar or diverse treatment materials through which fluid to be treated, such as water, flows. Some compartmentalized tank assemblies actually comprise two serially interconnected tanks which may be coupled to each other by a releasable fitting.

As an example, in certain water treatment devices, two individual tanks each containing the water treatment material are stacked and coupled together. In this type of tank assembly, fluid connections are made at the top of the assembly. The water to be treated must flow through the material in both tanks and then exit the tank assembly. In order to achieve this flow path, while providing fluid connections at the top of the tank for both the inflow and the outflow of water, a conduit, often termed a "riser" extends from the top of the upper tank to the bottom of the lower tank. A connection is made to the riser by which fluid is communicated to, or received from, the tank assembly depending on the direction of flow. With this arrangement, water to be treated may be introduced at the bottom of the lower tank, via the riser tube, travel through the fluid treatment material in the lower tank, through the tank coupling, through the fluid treatment material in the upper tank, finally leaving the tank assembly through the connection communicating with the top of the upper tank. Reverse flow is also possible where water to be treated is introduced at the top of the upper tank, travels through the material in the upper tank, and then through the material in the lower tank, finally exiting the tank assembly by flowing into the riser tube that opens at the base of the lower tank.

With present tank constructions, if service is required in one of the tanks, the tank assembly must be separated and the riser tube removed from the tanks. This can be a very expensive and time-consuming process, since each tank contains a fluid treatment material, such as an ion exchange resin, which should not be commingled or lost. In many cases, the resins must be separately dumped from each tank into appropriate containers for reuse.

Examples of treatment apparatus that include serially interconnected tanks are shown in U.S. Pat. Nos. 4,693,814; 4,804,465; and 5,310,488, all of which are owned by the assignee of the subject application and are hereby incorporated by reference.

DISCLOSURE OF INVENTION

The present invention provides a new and improved apparatus for releasably joining serially connected tanks. When used in a fluid treatment system in which the serially connected tanks include diverse treatment materials, the disclosed coupling apparatus reduces the risk of cross contamination of the material when the tanks need to be separated for service, etc.

According to the invention, the treatment tanks are interconnected by a coupler that includes first and second tank engagement sections which are releasably engageable with ports forming part of each tank. The coupler defines a fluid passage which, in the preferred and illustrated embodiment, is centrally located. The fluid passage includes structure for receiving a riser tube in a sealing relationship, which extends through the first tank and structure for receiving a second riser tube, in a sealing relationship, that extends into the second tank.

In the preferred and illustrated embodiment, the riser tube associated with one tank is held in the fluid passage by a snap fit mechanism. In the preferred embodiment, O-ring seals carried in grooves forming part of the fluid passage sealingly engage the periphery of respective riser tubes and inhibit fluid leakage between the coupler and the riser tubes.

The coupler also defines a second fluid passage which cross-communicates the interior of the serially connected tanks and, in particular, defines a transfer passage for allowing fluid from one tank to flow into the other tank.

In the preferred embodiment, the tank coupler is integrally molded from a polymeric material such as NORYL (glass reinforced) which is available from General Electric Company and may be injection molded to form a unitary component.

In the exemplary embodiment, the O-ring seals for sealingly engaging the riser tubes in the tank coupler are held in position by retainers.

In the preferred construction, the disengagement of the riser tubes from the tank coupler, when the tanks are separated is controlled to decrease the chances of material in the tanks of intermixing. As disclosed above, the riser tube associated with the one tank is preferably held in the tank coupler fluid passage by a snap fit mechanism. The other riser tube is frictionally held within the fluid passage so that when the tanks are separated, the second tube is released by the tank coupler when the tanks are separated.

The disclosed invention eliminates the need for a continuous riser tube that is typically used in the prior art and which, in effect, is a continuous tube that extends from the top of the one tank to the bottom of the second tank. In order to separate the tanks of the prior art, the riser tube is usually removed from both tanks which increases service costs and increases the chances of material in the tanks of being intermixed.

Additional features of the invention will become apparent and a fuller understanding obtained by reading the following detailed description made in connection with the accompanying drawings.

BEST MODE FOR CARRYING OUT THE INVENTION

Figure 1:
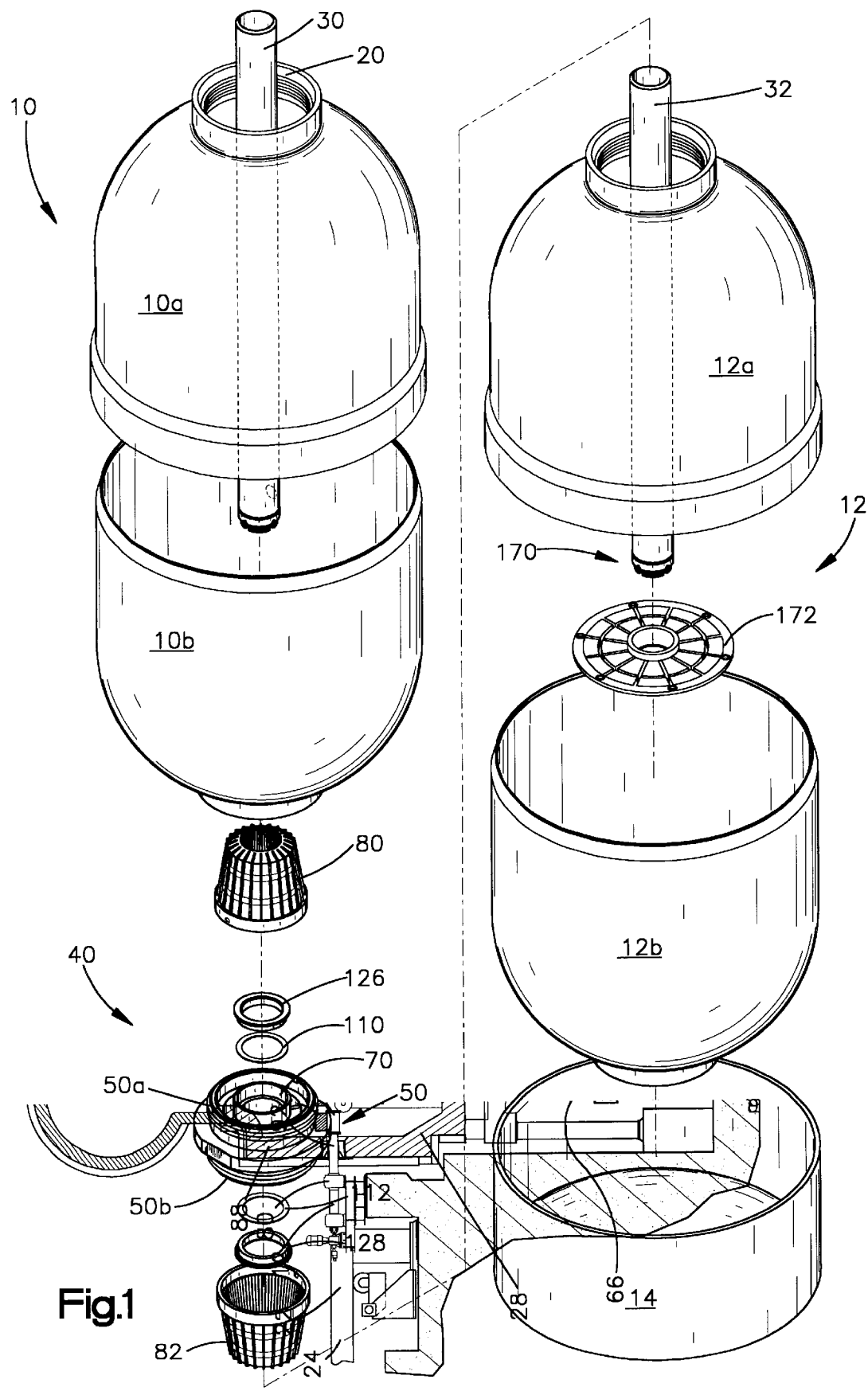
FIG. 1 is an exploded view of a tank assembly embodying the present invention; and, FIG. 2 is a fragmentary, sectional view of the tank assembly showing details of a tank coupler constructed in accordance wit h the invention.

FIG. 1 is an exploded view of a tank assembly embodying the present invention. The assembly comprises upper and lower tanks indicated generally by the reference characters 10, 12. The tanks themselves are considered conventional and, in the illustrated embodiment, comprise, respective, upper and lower half shells 10a, 10b, and 12a, 12b, which are joined together using conventional methods to form a complete tank.

In use, each tank contains a fluid treatment material through which fluid, such as water, passes and is treated thereby. For example, when the tank assembly is used in a water treatment system, one of the tanks may contain a filter material for trapping particulate matter carried by the water, whereas the second tank may include an ion exchange material which is selected to remove predetermined ions from the water flowing through the material.

When assembled, the tanks 10, 12, are in a stacked, axially aligned relationship. A base 14 is preferably attached to the lower tank and supports the tank assembly in a vertical position.

When the tank assembly forms part of a fluid treatment system, fluid to be treated is introduced at the bottom of the lower tank 12 by means of riser tube members (to be described) and rises upwardly through the material in tank 12. The fluid to be treated then flows through the material in tank 10, exiting the top of tank 10 through an opening 20 which, in general, is connected to a control valve or other fluid conduit into which the treated fluid flows. In prior art tank assemblies, the fluid to be treated is introduced at the base of the tank 12 by a one piece, continuous riser that extends from the top of the tank 10, through a coupler which mechanically interconnects the tanks and through the lower tank 12, terminating near the bottom of the tank 12.

A conventional tank assembly which includes a single, unitary riser tube, is difficult to service since, in order to separate the tanks, the riser tube must be removed. This presents a potential for commingling the treatment materials between the tanks which is undesirable.

According to the invention, the riser tube members comprise first and second riser tubes 30, 32 that are disposed in the tanks 10, 12, respectively, when the tanks are assembled. The riser tubes or conduits 30, 32 are intercommunicated to, in effect, provide a single riser tube assembly, by a tank coupler indicated generally by the reference character 40.

Figure 2:
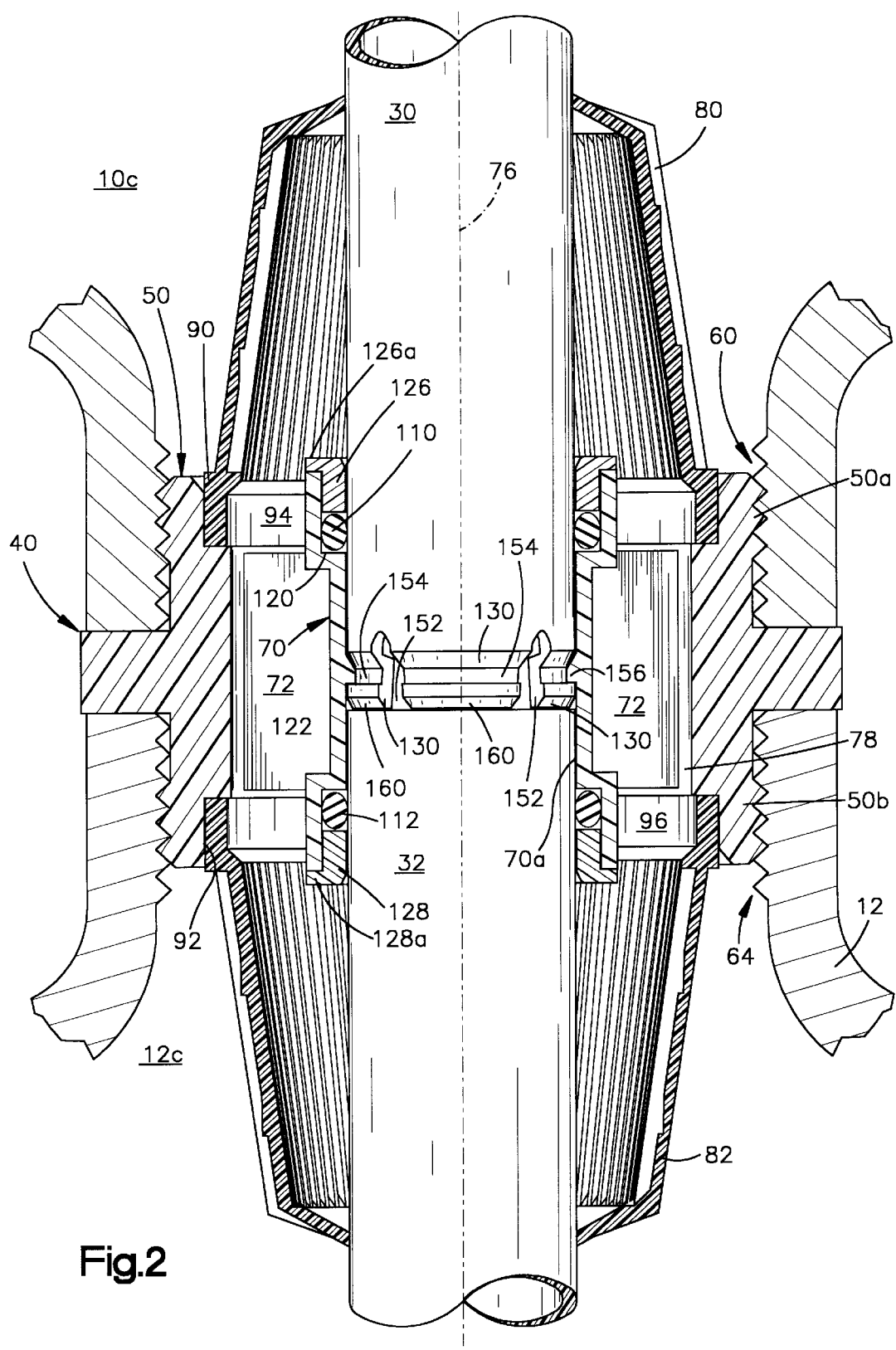

Referring also to FIG. 2, details of the coupler 40, as well as the riser tube 30, 32, are illustrated. In the preferred embodiment, the coupler 40 includes a molded coupler outer body 50 which includes upper and lower threaded portions 50a, 50b. The upper portion 50a is adapted to threadedly engage a threaded opening located at or near the base of the upper tank 10, indicated generally by the reference character 60. The lower threaded portion 50b is intended to threadedly engage a threaded opening 64 formed at the top of the tank 12. In effect, the threaded portions 50a, 50b of the coupler outer body 50 mechanically interconnect the upper and lower tanks 10, 12.

The coupler 40 also includes an integrally formed, centrally located riser tube connecting portion 70 which may be tubular in shape. In the illustrated embodiment, three integrally formed ribs 72 (only 2 are shown in FIG. 2) support the riser tube connecting portion 70 in alignment with a central axis 76 of the tank assembly. The connecting portion defines a passage 70a which as explained below is sized to receive ends of the riser tubes 30, 32.

The spacing between the riser tube connecting portion 70 and the outer, tank connecting portion 50 defines a somewhat annular flow passage 78 which cross communicates the interiors 10c, 12c, of the tanks 10, 12, respectively. The outer body portion 50 of the coupler 40 mounts upper and lower distributors 80, 82 which each allow fluid to travel between the interior of a tank and the annular passage 78, but which each inhibit the transfer of treatment material from the interior of a tank into the flow passage 78.

In the illustrated embodiment, the outer body 50 of the tank coupler 40 includes upper and lower grooves 90, 92 which are adapted to receive rim-like portions 94, 96 defined by the distributors 80, 82. Preferably, the rims 94, 96 are fixed to the grooves 80, 82 by suitable means, such as fasteners or adhesive.

The riser tube connecting or coupler portion 70 is operative to cross-communicate the first and second riser tubes 30, 32 which extend through respective tanks 10, 12. The riser tube coupler portion 70 provides a sealing interface which effects a mechanical and fluid coupling between the riser tubes 30,32 while isolating both riser tubes from the tank interiors 10c, 12c.

The connecting portion 70 also provides a means for releasing at least one of the riser tubes should the tanks 10, 12 be separated. In particular, the connecting portion 70 carries O-rings 110, 112 which are operative to sealingly engage the periphery of the upper and lower riser tubes 30, 32. In the preferred embodiment, the O-rings are carried in respective O-ring grooves 120, 122 and are maintained in the grooves by respective retainers 126, 128 which are hat-shaped in cross section and which each include respective radial portions which abuttably engage associated end surfaces of the connecting portion 70. The retainers 126, 128 are, preferably secured to the grooves 120, 122 by adhesive or other suitable means.

In the preferred embodiment, one of the riser tubes is locked to the connecting portion 70 so that only one of the riser tubes is released from the connecting portion 70 when the tanks 10, 12 are separated from the coupler. As seen in FIG. 2, the upper riser tube terminates in a snap fit-type structure. In particular, the lower end of the upper riser tube terminates in a plurality of tabs 130. In the illustrated embodiment, four tabs are defined by four axial slots 152 (only two are shown). A groove 154 is formed in each tab 130 and is engageable with an internal shoulder 156 forming part of the riser tube connecting portion 70. The very end of each tab 130 defines a camming or chamfered surface 160 which cooperates with a similarly shaped internal camming surface formed on the shoulder 156 to urge the ends of the tabs 130 inwardly as the riser tube is pushed into the connecting portion 70. When the ends of the tabs 130 are pushed a predetermined distance past the shoulder, the tabs 130 spring outwardly as the internal shoulder 156 enters the aligned grooves 154. In the illustrated construction, as the one riser tube 30 is pushed into position, it is locked to the connecting portion 70 and cannot be readily removed.

The snap-fit structure may be integrally formed on the end of the riser tube or, alternately, may form part of a separate adaptor which is suitably secured to the end of the riser tube.

In the preferred and illustrated embodiment, and as best seen in FIG. 1, the lower riser tube 32 also terminates in snap-fit structure indicated generally by the reference character 170. The snap-fit structure may be the same or similar to the snap-fit structure forming part of the upper riser tube 30. The snap-fit structure 170 is intended to lock to a lower distributor 172 which is may be fixed to the bottom of the lower tank 12. Once pushed into position, the distributor 172 inhibits removal of the lower riser tube 32 from the lower tank 12.

With the disclosed construction, the tanks 10, 12 can be easily separated in order to perform service on either or both tanks. With the preferred snap fittings, the parts separate along predetermined interfaces. In particular, when the lower tank 12 is unscrewed from the coupler 40, the upper riser tube 30 remains engaged with the coupler 40, whereas the lower riser tube 32, which is locked to the lower distributor 172, separates from the coupler 40 and remains at the lower tank. As a result, the risk of co-mingling fluid treatment material in the upper and lower tanks is greatly diminished.

Since an O-ring seal 112 is used between the lower riser tube 32 and the coupler 40, the tanks 10, 12 are reassembled by simply screwing the lower tank 12 into the coupler 40 (which preferably remains with the upper tank). As the lower tank 12 is screwed onto the coupler, the upper end of the lower riser tube 32 moves into sealing engagement with the riser tube connecting portion 70 of the tank coupler 40.

The disclosed invention substantially improves the serviceability of interconnected, serially arranged tanks. The use of snap fit mechanisms facilitates manufacturing and assembly of the tanks and also controls separation of the components to minimize the commingling of material contained in the tanks. These features are achieved at a minimal increase in costs, as compared to prior art constructions.

Although the invention has been described with a certain degree of particularity, it should be understood that those skilled in the art may make changes to it without departing from the spirit or scope of the invention has hereinafter claimed.

I claim:

1. A tank assembly comprising:
   a) at least two fluid treatment compartments interconnected by a coupler;
   b) one of said compartments including aligned, spaced-apart ports, one of said ports adapted to receive a portion of said coupler;
   c) the other of said compartments defining at least one port adapted to receive another portion of said coupler;
   d) said coupler defining a first centrally located fluid passage and a second, substantially annular passage for cross-communicating said first and second compartments, said second passage at least partially surrounding said first passage;
   e) a first riser tube having an associated end portion received by structure forming part of said central fluid passage, such that said central fluid passage is communicated with fluid conveying structure located at said one port of said first compartment;
   f) a second riser tube having an associated end portion received by other structure of said central passage and extending from said coupler to a region in said second compartment spaced from said coupler;
   g) sealing elements for concurrently sealing said riser tubes to said coupler when said compartments are interconnected by said coupler, while allowing at least one of said riser tubes to be released from said central passage upon separation of said compartments.

2. A tank coupler assembly for coupling a first tank having an associated first tank port and a second tank having an associated second tank port, comprising:
   a) coupler structure defining a first coupling section for releasably engaging said first tank port of said first tank and a second coupling section for releasably engaging said second tank port of said second tank;
   b) said coupler structure defining a first fluid passage including riser tube receiving means that receives, in sealing engagement, a first riser tube, said first riser tube extending into said first tank;
   c) said first fluid passage further defining retaining structure that releasably engages in a sealing relationship, a second riser tube, said second riser tube extending into said second tank; and
   d) said coupler structure further defining a second fluid passage for cross-communicating interior compartments of said tanks.

3. The apparatus of claim 2, wherein said first riser tube is held within said first fluid passage by a snap fit mechanism.

4. The apparatus of claim 3, wherein said first fluid passage defines O-ring receiving structure which holds O-rings that sealingly engage said riser tubes and inhibit fluid leakage between said riser tubes and said coupler structure.

5. The apparatus of claim 4, further comprising first and second distributors which are disposed at opposite ends of said second fluid passage.

6. The apparatus of claim 5, wherein said coupling sections comprise threaded segments in said coupler structure which are engageable with internally threaded segments forming part of said tank ports.

7. The apparatus of claim 3, wherein said snap fit mechanism is formed by an adaptor secured to an end portion of said first riser tube.

8. The apparatus of claim 2, wherein said first riser tube extends from said coupler structure, upwardly through said first tank and extends through a second port formed in said first tank, axially aligned with said first port and which communicates with a passage forming part of a control valve that is fluidly connected to said first tank.

9. The apparatus of claim 2, wherein said second riser tube extends downwardly through said second tank and terminates near a bottom region of said tank.

10. The apparatus of claim 9, wherein a terminating end of said second riser tube mounts a tank distributor.

11. The apparatus of claim 10, wherein said tank distributor is held to said second riser tube by a snap fit mechanism.

12. The apparatus of claim 2, wherein said second fluid passage is substantially annular with respect to said first fluid passage.

13. The apparatus of claim 12, wherein said first fluid passage is defined by a tubular member integrally formed, and held in its spatial position with respect to a periphery of said annular passage by a plurality of support ribs.

14. The apparatus of claim 13, wherein said coupler structure mounts distributors associated with each tank and which inhibit the flow of material contained within said tanks into said annular passage, while permitting fluid to flow from said first tank to said second tank.

15. The apparatus of claim 14, wherein said first tank is oriented as an upper tank and said second tank is oriented as a lower tank, said first and second tanks being vertically aligned on a common axis which is coincident with an axis of said first fluid passage.

16. A tank assembly, comprising:
   a) a first tank containing fluid treatment material and a second tank containing fluid treatment material, said tanks interconnected by a coupler body;
   b) said first tank defining spaced apart ports, one of said ports adapted to releasably engage a first portion of said coupler body;
   c) said second tank defining at least one port adapted to releasably engage a second portion of said coupler body;
   d) said coupler body defining a first centrally located fluid passage and a second passage, spaced from said first fluid passage, said second fluid passage cross communicating interior regions of said first and second tanks;

e) a first riser tube having an associated end portion received by said coupler body, such that a passage defined by said first riser tube is communicated with said first fluid passage;

f) a second riser tube having an associated end portion received by other structure of said coupler body, said second riser tube extending from said coupler body to a region in said second tank and communicating with said first fluid passage; and g) sealing elements for concurrently sealing said riser tubes to said coupler body, while allowing at least one of said riser tubes to be released from said coupler body upon separation of said tanks.

17. The apparatus of claim 16, wherein the fluid treatment materials in said first and second tanks are diverse.

18. The apparatus of claim 17, wherein said second fluid passage is generally annular with respect to said first fluid passage.

* * * * *